United States Patent
Goodwin et al.

(10) Patent No.: US 7,329,308 B2
(45) Date of Patent: Feb. 12, 2008

(54) AIR HANDLING AND CHEMICAL FILTRATION SYSTEM AND METHOD

(75) Inventors: William M. Goodwin, Medway, MA (US); Oleg P. Kishkovich, Greenville, RI (US); Anatoly Grayfer, Newton, MA (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/888,573

(22) Filed: Jul. 9, 2004

(65) Prior Publication Data

US 2005/0081715 A1  Apr. 21, 2005

Related U.S. Application Data

(60) Provisional application No. 60/485,768, filed on Jul. 9, 2003.

(51) Int. Cl.
   *B01D 47/14* (2006.01)

(52) U.S. Cl. .............. 95/149; 95/210; 438/909

(58) Field of Classification Search ........... 95/149, 95/210, 211, 227–229; 96/234; 454/187; 438/909; 236/44 R–44 E
See application file for complete search history.

(56) References Cited

U.S. PATENT DOCUMENTS

| | | | |
|---|---|---|---|
| 1,222,541 A | 4/1917 | Donbam | 183/9 |
| 2,038,071 A | 4/1936 | Wilhelm | 183/4 |
| 2,057,579 A | 10/1936 | Kurth | 183/9 |
| 2,110,203 A | 3/1938 | Crawford | 261/26 |
| 3,144,315 A | 8/1964 | Hunn | 55/274 |
| 3,785,127 A | 1/1974 | Mare | 55/233 |
| 4,171,624 A | 10/1979 | Meckler et al. | 62/271 |
| 4,181,513 A | 1/1980 | Fukuda et al. | 55/316 |
| 4,259,096 A | 3/1981 | Nakamura et al. | 55/316 |
| 4,323,374 A | 4/1982 | Shinagawa et al. | 55/132 |
| 4,397,662 A | 8/1983 | Bloomer | 55/228 |
| 4,544,380 A | 10/1985 | Itou et al. | 55/80 |
| 4,548,627 A | 10/1985 | Landy | 55/385 |
| 4,549,472 A | 10/1985 | Endo et al. | 98/34.6 |
| 4,604,108 A | 8/1986 | Cotton, Jr. | 55/20 |
| 4,704,348 A | 11/1987 | Koizumi et al. | 430/327 |
| 4,877,433 A | 10/1989 | Oshitari | 55/486 |
| 4,878,929 A | 11/1989 | Tofsland et al. | 55/486 |
| 4,926,620 A | 5/1990 | Donle | 55/89 |
| 4,927,438 A | 5/1990 | Mears et al. | 55/385.2 |
| 4,992,084 A | 2/1991 | Von Blucher et al. | 55/316 |
| 5,124,856 A | 6/1992 | Brown et al. | 360/97.03 |
| 5,133,788 A | 7/1992 | Backus | 55/467 |
| 5,194,414 A | 3/1993 | Kuma | 502/80 |
| 5,262,129 A | 11/1993 | Terada et al. | 422/122 |
| 5,302,354 A | 4/1994 | Watvedt et al. | 422/177 |
| 5,308,533 A | 5/1994 | Hotaling et al. | 252/181.6 |
| 5,360,572 A | 11/1994 | Hotaling et al. | 252/181.6 |
| 5,405,584 A | 4/1995 | Zito | 422/90 |
| 5,435,958 A | 7/1995 | Dinnage et al. | 264/171 |
| 5,470,612 A | 11/1995 | Hotaling et al. | 427/377 |
| 5,620,503 A | 4/1997 | Miller et al. | 95/211 |
| 5,772,738 A | 6/1998 | Muraoka | 96/129 |

(Continued)

*Primary Examiner*—Frank M. Lawrence
(74) *Attorney, Agent, or Firm*—Weingarten, Schurgin, Gagnebin & Lebovici LLP (57) ABSTRACT

The present invention relates to systems and methods for controlling humidity and temperature in gases or air streams used in semiconductor processing systems. These systems and methods can be used in combination with systems and methods for contaminant detection and removal.

25 Claims, 7 Drawing Sheets

U.S. PATENT DOCUMENTS

| | | | |
|---|---|---|---|
| 5,856,198 A | 1/1999 | Joffe et al. | 436/100 |
| 5,879,458 A | 3/1999 | Roberson, Jr. et al. | 118/715 |
| 5,890,367 A | 4/1999 | You et al. | 62/78 |
| 5,892,572 A | 4/1999 | Nishi | 355/67 |
| 6,024,782 A | 2/2000 | Freund et al. | 96/154 |
| 6,033,301 A | 3/2000 | Suwa | 454/187 |
| 6,042,651 A | 3/2000 | Roberson, Jr. et al. | |
| 6,059,866 A | 5/2000 | Yamagata et al. | 96/251 |
| 6,120,584 A | 9/2000 | Sakata et al. | 96/135 |
| 6,146,451 A | 11/2000 | Sakata et al. | 96/135 |
| 6,214,089 B1* | 4/2001 | Li et al. | 95/45 |
| 6,221,163 B1 | 4/2001 | Roberson, Jr. et al. | 118/715 |
| 6,368,411 B2 | 4/2002 | Roberson, Jr. et al. | 118/715 |
| 6,372,022 B1* | 4/2002 | Hoffman et al. | 95/211 |
| 6,391,090 B1 | 5/2002 | Alvarez, Jr. et al. | 95/116 |
| 6,497,757 B2 | 12/2002 | Wakamatsu et al. | 96/290 |
| 6,503,462 B1 | 1/2003 | Michalakos et al. | 422/173 |
| 6,770,117 B2* | 8/2004 | Olander | 95/67 |
| 6,966,364 B1* | 11/2005 | Babikian et al. | 165/228 |
| 2001/0027678 A1 | 10/2001 | Mottram et al. | 73/23.2 |
| 2001/0042439 A1 | 11/2001 | Roberson, Jr. et al. | 95/8 |
| 2001/0048513 A1 | 12/2001 | Nagahashi | 355/53 |
| 2002/0011150 A1* | 1/2002 | Wakamatsu et al. | 95/214 |
| 2002/0033252 A1 | 3/2002 | Sasao et al. | 165/238 |
| 2003/0035087 A1 | 2/2003 | Murayama | 355/30 |
| 2004/0149134 A1* | 8/2004 | Chen et al. | 96/297 |

* cited by examiner

AIR HANDLING AND CHEMICAL FILTRATION SYSTEM AND METHOD

CROSS REFERENCES TO RELATED APPLICATIONS

The present application claims the benefit of U.S. Provisional Application No. 60/485,768, filed Jul. 9, 2003. The entire contents of the above applications are incorporated herein by reference in entirety.

BACKGROUND OF THE INVENTION

The quality of air in semiconductor processing tools is a major concern in the semiconductor manufacturing industry. Photolithography tools in particular require air of appropriate temperature, humidity and cleanliness (both with respect to particulates and molecular contaminants).

Traditional approaches to air humidity and temperature control use an air conditioning device that, for example, can exchange heat with an air stream and remove or add water vapor to the air stream.

The removal of contaminants from an air stream and, in particular, the removal of molecular contaminants, is traditionally performed with another device. For example, traditional approaches typically involve the use of activated carbon filters and/or combination of adsorptive and chemisorptive medias to control contamination in conjunction with a temperature and/or humidity controlling air-handling device to manage temperature and humidity of delivered air.

Traditional approaches to contaminant removal employ filters, or a series of filters, to remove particulates and molecular contaminants. Particulates are generally viewed as contaminates having a size of greater than about 0.1 microns. Molecular contaminants are generally viewed as those contaminants that form deposits (e.g., organics) and/or inhibit process performance (e.g., bases).

Filters, however, have several problems. Filters increase pressure resistance and thereby increase the pressure drop in the air handling system for a processing tool. Filters also have a limited service life, requiring that the filters be eventually removed and replaced. Such replacement can require downtime of the associated semiconductor processing tools to replace the filter elements and add to the overall cost of ownership of the process tool.

In addition, many filters have a limited capability in mitigating optics-damaging volatile organic compounds, especially in the lower molecular weight ranges because lower molecular weight organics are typically difficult to adsorb. Increasing the capability and/or capacity of a filter generally means adding greater amounts of adsorptive media, which in turn further increases pressure resistance and cost.

The filtration media of a filter may itself introduce particulate contamination requiring downstream particulate filtration. In addition, the filtration media of a filter may itself introduce chemical contamination. For example, traditional filtration methods involving the use of highly acidic medias may introduce damaging acid anions into the air stream, such as sulfur containing oxides, such as, for example, $SO_2$.

In addition, the filter media of a filter, especially of some traditional chemical filters, can create problems with air stream temperature and humidity control For example, highly acidic sulfonated medias (traditionally used for the removal of basic compounds, such as ammonia and amines) are by their chemical nature prone to reversible exothermic reactions with water (for example, hydration reaction). This heat and humidity interaction causes difficulty in the feedback control of air stream temperature and humidity. Difficulties in air stream humidity and temperature control are especially problematic in photolithography, as the typical objective is to manage temperature and/or humidity variation to ultra-low levels (for example, variations of less than tens of a milliKelvin in temperature, and variations of less than few tenths of a percent in relative humidity). Difficulties in air stream humidity and temperature control may substantially increase the time necessary to achieve control stability, for example, during a start-up process of a photolithography tool. An increase in the time to achieve control stability is directly related to tool availability, a production metric of concern to the semiconductor industry.

SUMMARY OF THE INVENTION

The systems and methods of the present invention include air handling and chemical filtration of gas streams for semiconductor processing tools. The systems and methods of the present invention utilize a scrubbing liquid, to reduce the concentration of one or more contaminates in the gas stream. Preferred scrubbing liquids included, but are not limited to water, de-ionized (DI) water and chemisorptive aqueous solutions. In preferred embodiments, the scrubbing liquid wets the surface of an absorption structure (e.g., as droplets and/or a film) and one or more contaminates are removed from the gas stream by sorption in the scrubbing liquid. For example, one or more contaminates can be removed from the gas stream by absorption, adsorption, dissolution, or combinations thereof, in the scrubbing liquid. Adsorption can include, but is not limited to, chemisorption and physisorption. In addition, species can be removed by sorption into the scrubbing liquid, onto the surface of the scrubbing liquid, or a combination of both.

The systems and methods of the present invention can be used on a wide variety of molecular contaminants from a wide variety of gas streams used in semiconductor processing tools. In various embodiments, molecular contaminants which can be removed include, but are not limited to, acids, bases, high and low molecular weight organic compounds, and compound classes that include, but are not limited to, microelectronic dopants, molecular condensables and refractory compounds. In various embodiments, the concentration of one or more contaminants can be reduced in gas streams including, but are not limited to, streams of air, clean dry air (CDA), oxygen, nitrogen, and one or more noble gases.

High molecular weight organics include compounds having greater than about six carbon atoms ($C_6$ compounds). Low molecular weight organics include compounds having about six carbon atoms or less ($C_1$-$C_6$ compounds). Molecular condensables include high boiling point (i.e., boiling points greater than about 150° C.) organic materials. Molecular condensables can, for example, be adsorbed on the optical elements of a photolithography tool and undergo deep ultra violet (DUV) light induced radical condensation or polymerization. Such DUV light can include, for example, 193 nm and 157 nm light. Refractory materials are compounds containing atoms forming nonvolatile or nonreactive oxides, for example, but not limited to, phosphorous (P), silicon (Si), sulfur (S), boron (B), tin (Sn), aluminum (Al). These contaminants, when exposed to DUV light, can form refractory compounds resistant to traditional photolithography tool cleaning approaches and even condense irreversibly on optical surfaces. Refractory materials include refractory organics such as, for example, silanes, siloxanes (such as, e.g., hexamethyldisiloxane), silanols, iodates. Future examples, of molecular contaminants whose concentration in a gas stream can be reduced by various embodiments of systems and methods of the present invention are listed in Table 1.

TABLE 1

| Compound |
| --- |
| Ammonia |
| Sulfuric Acid |
| Nitrous acid |
| Nitric acid |
| Phosphoroganics |
| Dimethyl Sulfoxide (DMSO) |
| Hexamethyldisiloxane (HMDSO) |
| Silane, Tetramethoxy (TEOS) |
| Silane, Dimethoxydimethyl |
| Benzene |
| Hexane, 3-Methyl |
| 2-Heptane |
| Silane, Trimethoxymethyl |
| Hexane, 2,5-Dimethyl |
| Toluene |
| Propanoic acid, 2-hydroxy-ethyl ester |
| propylene glycol methyl ether acetate (PGMEA) |
| dipropylene glycol meethyl ether (DPGME) |
| propylene glycol methyl ether (PGME) |
| Ethylbenzene |
| n-Propylbenzene |
| Cyclohexane |
| Xylenes |
| Styrene |
| 1,2,3 Trimethylbenzene |
| 1,3,5 Trimethylbenzene |
| Cyclohexanone |
| 3-Heptanone |
| Octane, 2,6-Dimethyl |
| Cyclohexane, (1-Methylethyl) |
| Nonane |
| Octane, 2,5,6-Trimethyl |
| Octane, 2,2,7,7-Tetramethyl |
| Octane, 2,2,6-Trimethyl |
| Benzene, 1-Ethyl, 3-Methyl |
| Decane, 2-Methyl |
| Benzene, 1-Ethyl, 2-Methyl |
| Benzaldehyde |
| Carbamic acid, methyl-, phenyl ester |
| Heptane, 2,2,4,6,6-Pentamethyl |
| Decane, 2,2-Dimethyl |
| Decane, 2,2,9-Trimethyl |
| Nonane, 3,7-Dimethyl |
| Decane, 5,6-Dimethyl |
| Decane, 2,3-Dimethyl |
| Nonane, 3-Methyl-5-propyl |
| Decane, 2,6,7-Trimethyl |
| Heptane, 4-Ethyl-2,2,6,6-Tetramethyl |
| Undecane, 2,5-Dimethyl |
| Undecane, 4,6-Dimethyl |
| Undecane, 3,5-Dimethyl |
| Undecane, 4-methyl |
| Nonane, 3-methyl-5-propyl |
| Undecane, 5,7-Dimethyl |
| Undecane, 3,8-Dimethyl |
| Dodecane, 2,5-Dimethyl |
| Heptane, 2,2,3,4,6,6-Hexamethyl |
| Dodecane, 2,6,10-Trimethyl |
| Tridecane, 5-Methyl |
| Tridecane, 4-Methyl |
| Dodecane |
| Benzoic acid |
| Cyclotetrasiloxane, Hexamethyl |
| Cyclotetrasiloxane, Octamethyl |
| 2,5 Cyclohexadiene-1,4-dione, 2,5-diphenyl |

The systems and methods of the present invention can be used to remove particulates from gas streams used in semiconductor processing tools. In various embodiments, the present invention facilitates removing particulates with an average particle size of less than about 0.01 microns. In various embodiments, the present invention facilitates removing particulates with an average particle size of less than about 0.02 microns, and in various embodiments, the present invention facilitates removing particulates with an average particle size of less than about 0.1 microns.

The systems and methods of the present invention can be used, for example, on a single semiconductor tool, a cluster of tools (such as, for example, a photolithography cluster of an exposure tool and photoresist coat/develop tool), or a tool set (such as, for example a development track and exposure tool). In various preferred embodiments, the present invention provides air handling and chemical filtration systems that facilitate reducing the cost of ownership for contamination control compared to conventional methods of adsorptive filtration.

In various embodiments, the present invention reduces or eliminates some of the problems associated with traditional filters by providing a chemical filtration system that can repeatedly regenerate a filtering media without the semiconductor tool downtime associated with replacing traditional filter elements. In the present invention, the filtering media includes the scrubbing liquid.

In various embodiments, the present invention reduces or eliminates some of the problems associated with traditional filters by providing a chemical filtration system that utilizes a filtering media that does not substantially generate particulates such as are associated with traditional filter elements. In the present invention, the filtering media includes the scrubbing liquid.

In various embodiments, the present invention reduces or eliminates some of the problems associated with traditional filters by providing a chemical filtration system that can remove molecular contaminants without the humidity and temperature control difficulties created by some traditional filter elements. For example, by the use of a scrubbing liquid as a filtering media in accordance with the present invention, various embodiments of the present invention avoid introducing damaging concentrations of acids, bases, or both into the gas stream. In various preferred embodiments, the present inventions' approach to temperature and humidity control is more capable of handling disturbances in upstream temperature and humidity than traditional systems.

In various embodiments, the present invention provides an integrated air handling and chemical filtration system for semiconductor tools. Such integrated systems can facilitate providing a system with a smaller footprint than the combined footprint of traditional air handling units and filtration systems. In addition, in various embodiments, an integrated air handling and chemical filtration system of the present invention can facilitate reducing capital and operating cost by combining two separate gas stream processing needs (air conditioning and chemical filtration) in one apparatus, simplifying the supply chain, ownership, support and maintenance.

In preferred embodiments, the present invention reduces a broad spectrum of chemical contamination from the gas stream serving a photolithography tool, including, but not limited to, contaminants such as listed in Table 1. In addition, in preferred embodiments, the present invention provides systems and methods that can supply a gas stream to a photolithography tool with very small levels of temperature and humidity variation. For example, in various preferred embodiments, the present invention provides a gas stream with a temperature variation less than about 10 millikelvin under constant pressure and flow rate conditions and a relative humidity variation of less than about 0.1%. In various embodiments, the present invention provides a gas stream with a temperature variation in the range from about 5 millikelvin to about 20 millikelvin under constant pressure and flow rate conditions and a relative humidity variation in the range from about 0.05% to about 0.5%. In various embodiments, the present invention provides a combined air handling and filtration apparatus that can provide temperature control, humidity control and filtration for a gas stream within a pressure within about 10 inches w.c. (water column) and a flow rate in the range from about 1 cubic feet per minute (CFM) to about 100,000 CFM; and preferably, a flow rate in the range from about 200 cubic feet per minute (CFM) to about 10,000 CFM.

In preferred embodiments, the invention provides a combined air handling and chemical filtration apparatus for a photolithography tool cluster used in the manufacture of semiconductor devices that is sensitive to molecular contamination. In various embodiments, the combined air-handling and filtering system removes molecular contamination which may include acids, bases, high and low molecular weight aromatic and aliphatic organics, and compound classes that include, but are not limited to, microelectronic dopants, molecular condensables and refractory compounds.

In various embodiments, the systems and methods further include provide metrology information. For example, in one embodiment, the present invention provides a system that can measure, either qualitatively, quantitatively, or both, the concentration of one or more contaminants in a gas stream from a semiconductor processing tool and the gas returned to the semiconductor processing tool by a system of the invention. In one embodiment, the invention provides methods for air handling and filtration that use metrology information to provide a gas stream with temperature controlled, relative humidity controlled, contaminant reduced, or combinations thereof to a semiconductor tool.

In various aspects, the invention also provides various systems and methods for air handling and filtration for one or more of pharmaceutical, biotechnology, food, and national security applications (for example, chemical and/or biological dangers). In various embodiments, the systems and methods of the present invention use more than one absorption section. In various embodiments, each absorption section or stage, can use, for example, the same scrubbing liquid, different scrubbing liquids, or the same scrubbing liquid with different additives in each stage. Such staged absorption sections can be used where, for example, the first additive is used to improve removal efficiency of one or more contaminants but the first additive itself may be a contaminant and the subsequent stages are used to remove the first additive from the gas stream.

For example, in one embodiment, having first and second absorption sections, the first absorption section is employed with a scrubbing liquid having a first additive that facilitates removal of one or more contaminants. Gas exiting the first absorption section enters a second absorption section. The second absorption section can contain a scrubbing liquid without an additive or a scrubbing liquid with the same or a second additive. The use of a second absorption section can provide, for example, further contaminant removal, removal of the first additive, or both.

In various embodiments, staging absorption sections can be used to provide information on the presence, concentration, or both of various contaminants. For example, a first absorption section can be used to remove a first contaminant and the concentration of the first contaminant in the gas stream is determined from the concentration in the scrubbing liquid exiting the first absorption section. The second absorption section is then used to remove a second contaminant and determine its concentration from the scrubbing liquid exiting the first absorption section. Such staged absorption sections, can be used in pharmaceutical, food, biotechnology and national security applications. For example, in a national security application one stage can be used to monitor or remove chemical contaminants and another to monitor or remove biological contaminants (such as, for example, particulates such as spores).

In various embodiments, the systems and methods of the present invention can be combined with one or more of the filter control systems, monitoring systems, methods or combinations thereof described in U.S. patent application Ser. No. 10/395,834 filed Mar. 24, 2003 and Ser. No. 10/205,703 filed Jul. 26, 2002, the contents of both applications being incorporated herein by reference in their entirety.

The foregoing and other features and advantages of the system and method for air handling and chemical filtration of gas streams for semiconductor processing tools will be apparent from the following more particular description of preferred embodiments of the system and method as illustrated in the accompanying drawings in which like reference characters refer to the same parts throughout the different views.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
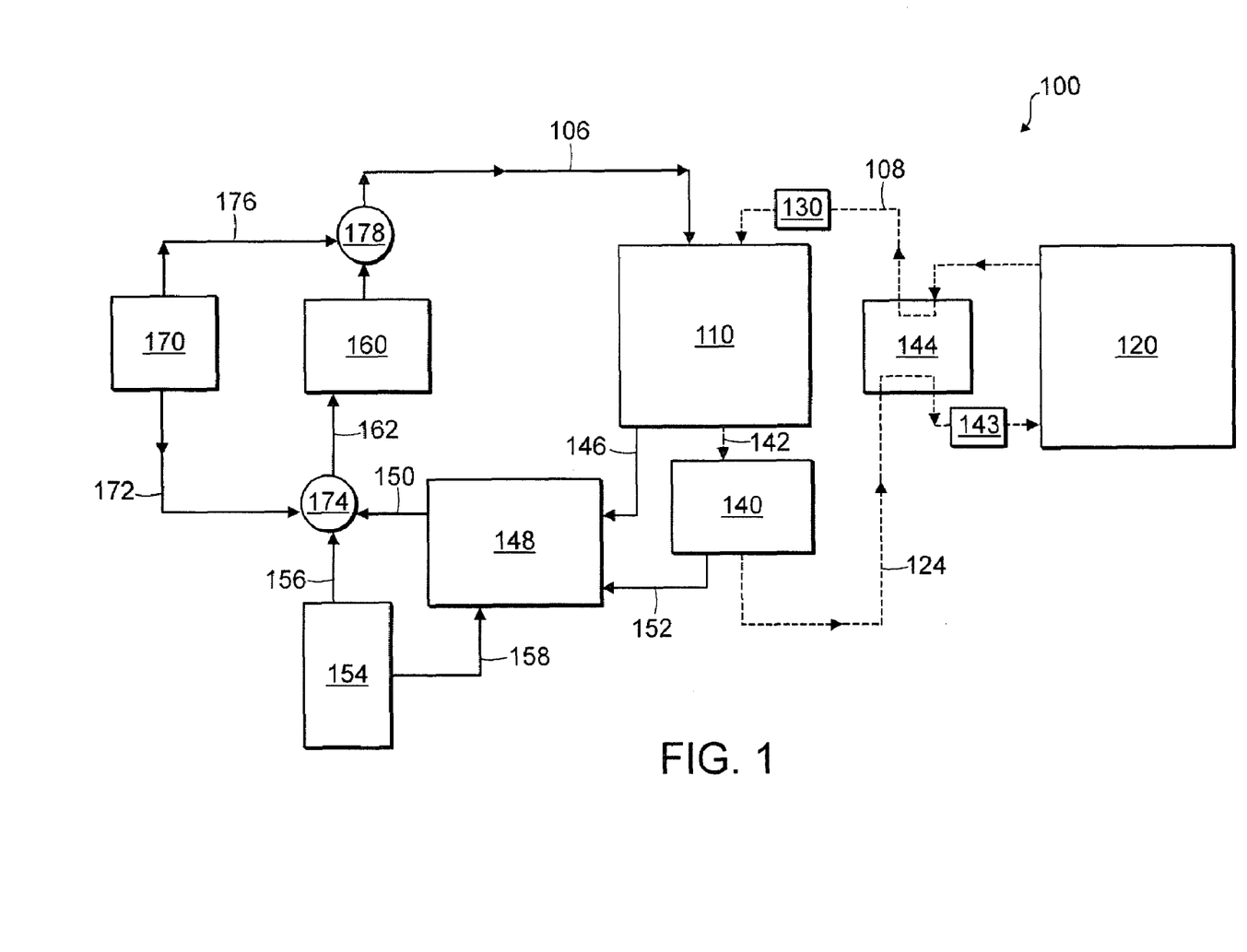
FIG. 1 is a block diagram of a co-current air handling and chemical filtration system in accordance with various embodiments of the present invention.
Figure 2:
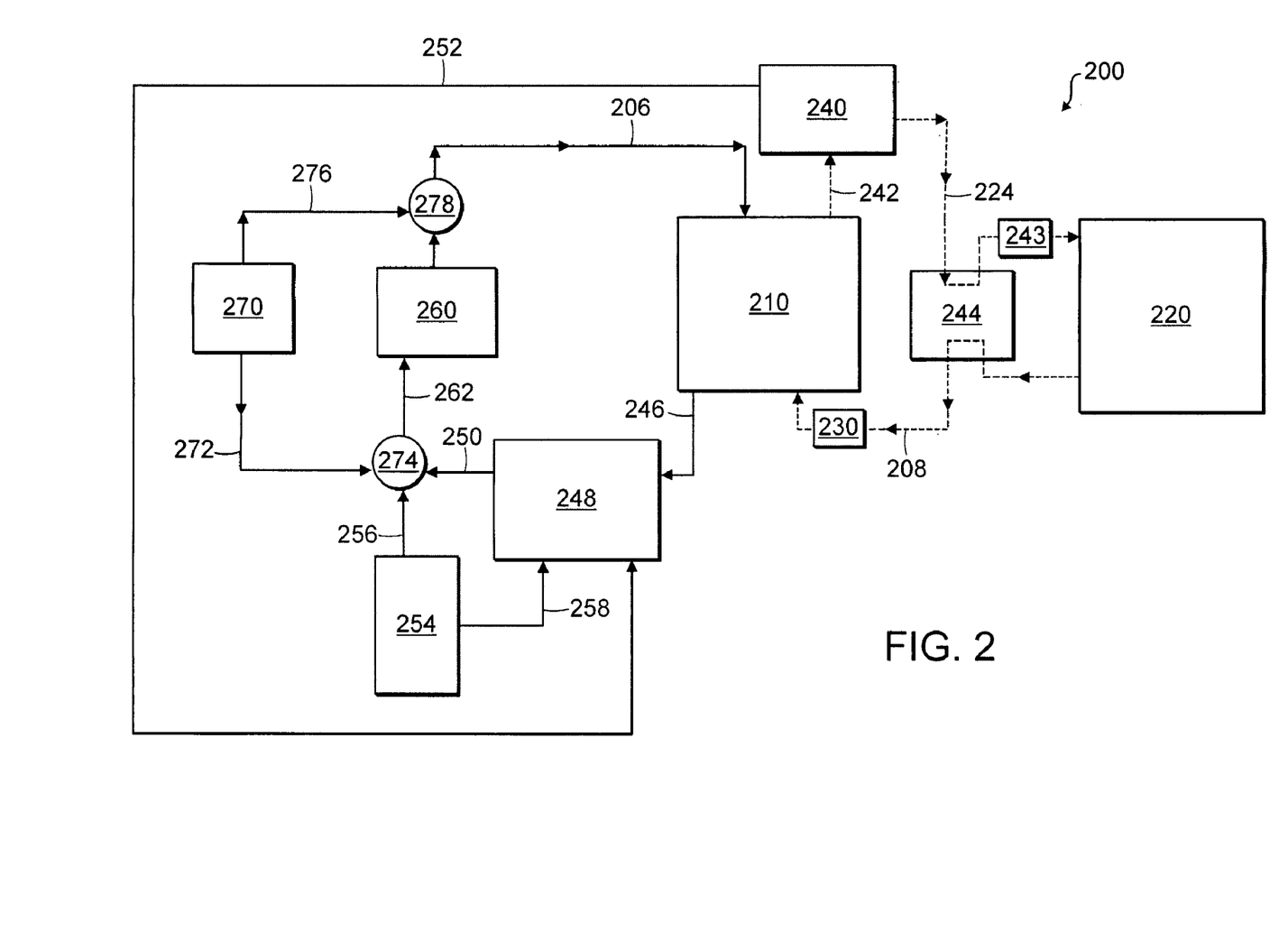
FIG. 2 is a block diagram of a counter-current air handling and chemical filtration system in accordance with various embodiments of the present invention.

Various preferred embodiments of air handling and chemical filtration systems in accordance with the present invention are illustrated in FIGS. 1 and 2. In FIGS. 1 and 2 gas flows are indicated by dashed lines and liquid flows by solid lines. The arrow heads on the dashed and solid lines indicate, respectively, the nominal direction of gas flow and liquid flow. In FIGS. 1 and 2 the systems and methods of the present invention are discussed in the context of de-ionized (DI) water as the scrubbing liquid, however, the present invention is not limited to a DI water scrubbing liquid. Other suitable scrubbing liquids encompassed by the present invention include, but are not limited to, water, oils, non-polar solvents and polar solvents such as, for example, alcohols. In embodiments using a scrubbing fluid comprising de-ionized water, it is preferred that the de-ionized water has a resistivity in the range from about 100,000 ohm centimeters ($\Omega$ cm) to about 18 M$\Omega$ cm.

FIG. 1 depicts a block diagram 100 of various embodiments of a co-current filtration system that are in accordance with the present invention. In a co-current system, an input scrubbing liquid stream 106 is introduced into an absorption section 110 in a similar flow direction to that of an output gas stream 108 from a semiconductor processing tool or tool set 120. More than one absorption section may be repeated, in series, within a co-current system to increase, for example, contaminant removal. One or more counter-current absorption sections can also be used in series with one ore more co-current sections. The absorption section contains an absorption structure wetted by the scrubbing liquid. As the gas passes the surfaces of the absorption structure wetted by scrubbing liquid, molecular contaminants with a higher chemical potential in the gas stream than the scrubbing liquid pass from the gas stream to the scrubbing liquid. The system thus provides to the tool or tool set 120 a return gas stream 124 with a reduced concentration of one or more contaminants found in the output gas stream 108 (also referred to herein as the incoming gas stream because it is incoming to the absorption section 110).

In preferred embodiments, the input scrubbing liquid 106 is introduced as an aerosol prior to the absorption structure in sufficient volume and temperature to form a liquid which wets and flows down the surfaces of the absorption structure. An aerosol of scrubbing liquid can be formed in many ways including, but not limited to, spray nozzle systems that inject into a "contacting zone" and systems that apply jets of compressed air onto the surface of a rotating or stationary scrubbing liquid distributor within the compressed air stream.

Figure 3A:
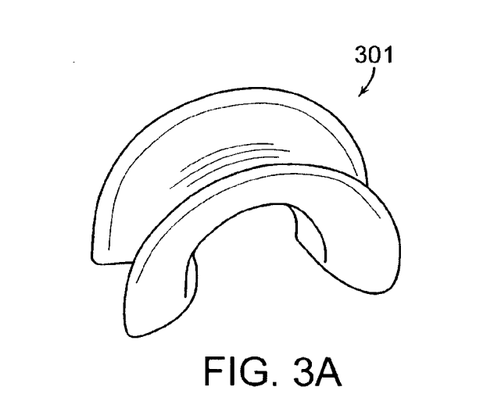
FIGS. 3A-3C illustrate various examples of loose packed-bed structures.
Figure 3B:
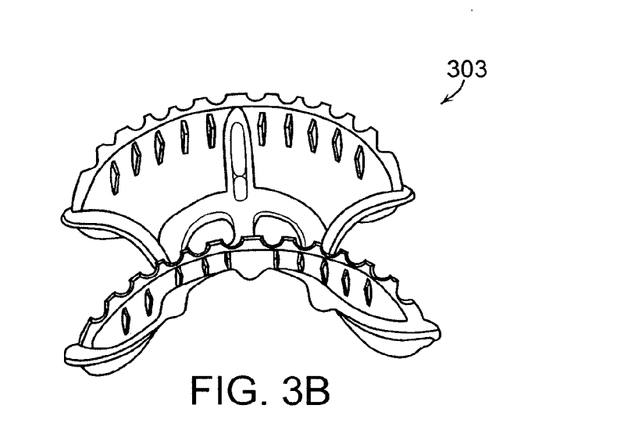
Figure 3C:
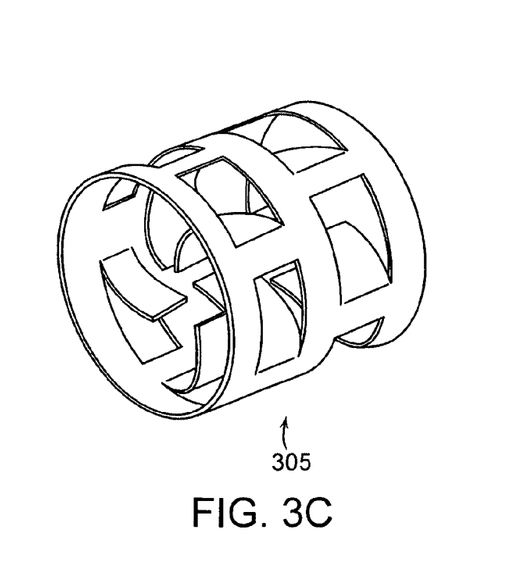
Figure 3D:
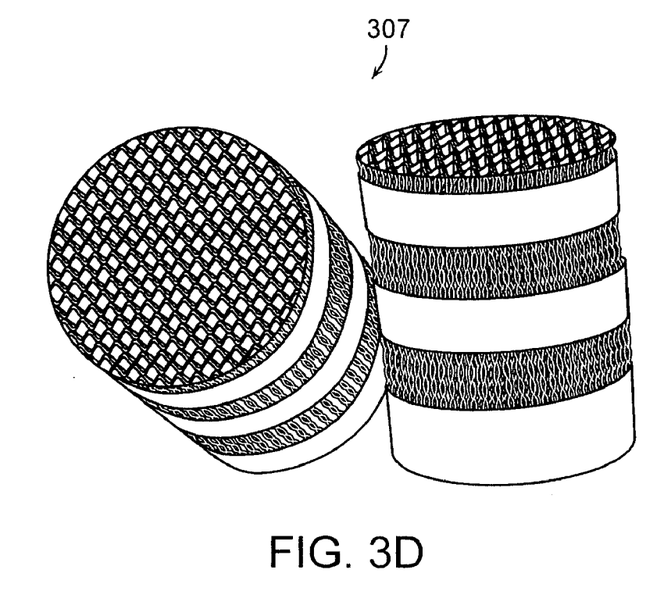
FIGS. 3D-3E illustrate various examples of structured packed-bed structures.
Figure 3E:
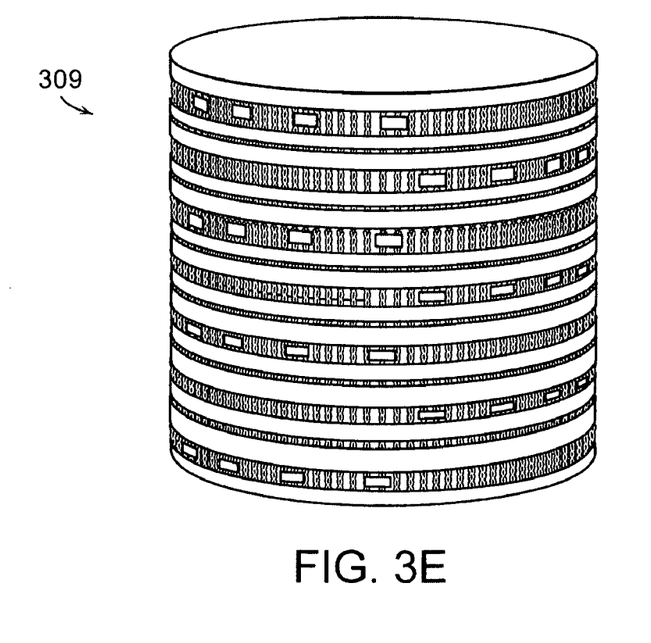

The absorption structure can comprise a loose packed-bed structure, structured packed-bed structure, or a combination of both. Preferably the absorption structure is a loose packed-bed structure, such as for example, Q-Pack, Lanpack and/or Nupack all manufactured by Lantec, Inc., Raschig rings, Pall rings, Berl saddles, Inatolex saddles, Flexrings, Ballast rings, and Cascade rings. Examples of structured packed-bed structures include, but are not limited to, Gempack™ cartridges, and Glitsch EF-25A Grid™, manufactured by Glitsch, Inc., of Dallas, Tex. FIGS. 3A-3E show examples of various packed-bed structures, where FIG. 3A 301 is an example of a ceramic Intalox™ saddle; FIG. 3B 303 is an example of a plastic Super Intalox™ saddle; FIG. 3C 305 is an example of a Pall ring; FIG. 3D 307 is an example of a Gempack™ cartridge; and FIG. 3E 309 is an example of a Glitsch EF-25A Grid™. The design of the absorption structure is preferably such that there is sufficient residence time of the gas stream to allow for mass transfer of molecular contaminants from the output gas stream to the scrubbing liquid on the absorption structure.

In various embodiments, the absorption section includes a source of UV energy (for example, such as a UV lamp) and absorption structures having TiO$_2$ coated surfaces. In combination with sufficient UV energy, such absorption sections are used to perform catalytic reactions within the absorption section that reduce organic compounds and facilitate their removal from an incoming gas stream.

In various embodiments, the incoming gas stream 108 is pre-processed with a pre-processor device 130 prior to entering the absorption section 110. In various embodiments, the pre-processor device 130 includes a source of UV energy (for example, such as a UV lamp) and surfaces coated with a photocatalyst such as, for example, TiO$_2$, ZnO, WO$_3$, or other inorganic compounds with proper UV light absorbing properties. In combination with sufficient UV energy, such pre-processor devices are used to perform photocatalytic reactions that can reduce organic (polar and non-polar) compounds and facilitate their removal from an incoming gas stream. For example, photocatalytical reaction can cause a partial "mineralization" of organic compounds (for example, formation of CO$_2$, H$_2$O) and the formation of by-products, the prevailing fraction of which are oxygenated substances. Thus non-polar compounds can be "transformed" to polar compounds which can be more effectively removed by a scrubbing liquid. In various embodiments, gaseous chlorine-containing compounds like trichloroethylene (TCE) or perchloroethylene (PCE), which greatly accelerate photocatalytical reaction of organics via additional chain reaction with Cl species, can be added to the incoming gas stream by the pre-processor device to, for example, "spike" the gas stream. Chlorine containing by-products and HCl formed in this case can be effectively removed by the scrubbing liquid and, in various embodiments, increase the scrubbing liquids removal efficiency towards bases due to this induced activity.

In various embodiments, a pre-processor device 130 introduces additives into the incoming gas stream 108 that facilitates the removal of one or more contaminates in the gas stream. The additive can, for example; (1) chemically reactive with one or more containments to produce species that are more readily removed by the scrubbing liquid; (2) change the chemical potential of one or more contaminants with respect to the scrubbing liquid to facilitate there removal; and (3) facilitate contaminant detection and concentration determination, for example, to provide metrology information, hazard warnings, et al.

The molecular contaminants which have a higher chemical potential in the gas stream than in the scrubbing liquid on the surfaces of the absorption structure are absorbed by the scrubbing liquid. In addition, because the expected concentration of some contaminants in the incoming gas stream are expected to be low (for example, typically lower than about 50 micrograms per cubic meter ($\mu$g/m$^3$) for non-polar organics); in the present invention, polar scrubbing liquids are not limited to reducing the concentration of polar contaminants and non-polar scrubbing liquids are not limited to reducing the concentration of non-polar contaminants. For example, non-polar organic contaminants with, for example, concentrations less than about 50 $\mu$g/m$^3$, can have sufficient solubility within a polar scrubbing liquid, such as, for example DI water, such that the scrubbing liquid can reduce the concentration of one or more of these non-polar organics.

At the end of the absorption section 110, a collection device 140 removes scrubbing liquid droplets from an outgoing gas stream 142. In preferred embodiments, the scrubbing liquid comprises DI water and the collection device 140 removes water droplets from the gas stream 142 such that the return gas stream 124 is saturated with water vapor at a desired relative humidity. Suitable approaches and devices for scrubbing liquid droplets from a gas stream, include, but are not limited to, collection by coalescing media, collection by vane separators and collection by an extended surface of a packed bed.

In various embodiments, the system includes a gas temperature control unit 143 that can adjust the temperature of the return gas stream 124. The gas temperature control unit can include a heater, cooler, or both. In various embodiments, the system can include a non-condensing regenerative heat exchanger 144. The heat exchanger 144, for example, can exchange enthalpy from the "warm" incoming gas stream 108 to the colder "washed" gas stream 124. The heat "recovered" can reduce any heating requirements for the return air stream 124 when the return air stream is colder than the output air stream 108. A reduction in heating requirements can reduce electrical power consumption, such as by electrical resistive elements, and thereby conserve energy resources and reduce operating costs.

The scrubbing liquid 146 exiting the absorption section is cleaned and recirculated with a recirculation unit 148 to provide cleaned scrubbing liquid 150. In various embodiments, scrubbing liquid removed 152 from the return gas stream is also conveyed to the recirculation unit 148 for cleaning and recirculation. Generally, separation of molecular contaminants from a liquid (such as, for example, separation of ionic species for DI water) is significantly more efficient with lower typical operating costs than atmospheric-pressure gas phase separation.

In preferred embodiments, the scrubbing liquid comprises DI water. DI water can be cleaned in a recirculated loop using conventional methods, such as, for example, (UF/RO), twin bed ion exchange resins, mixed bed resin bottles, and organic membrane separation, and liquid-phase carbon adsorption for organics removal and particle filtration for particulate removal. Scrubbing liquid cleaning can include, for example, photocatalysis on immobilized $TiO_2$ or $TiO_2$ slurry, and advanced oxidation processes, such as, for example, processes which include $H_2O_2$, $O_3$, Fenton's reagent, and ionizing radiation.

In various embodiments, the DI water is also treated by the recirculation unit to prevent biological fouling of the absorption structure and other wetted sections of the system, because, for example, de-ionized water containing dissolved chemical species (particulate, organic, and inorganic) can provide a reasonable source of "food" for biological activity. Suitable treatments to prevent biological fouling include, but are not limited to irradiation of the DI water with ultra violet (UV) light in the C band (about 200 nm to about 290 nm), ozonization and peroxidation.

To maintain scrubbing liquid volume, in various embodiments, scrubbing liquid is supplied as required from a scrubbing liquid supply 154. If the supply 154 provides sufficiently clean scrubbing liquid, then make-up scrubbing liquid can be supplied directly 156 and mixed with the cleaned scrubbing liquid 150. The supply 154 can also provide make-up fluid 158 to the recirculation unit 148. The scrubbing liquid supply can be any suitable supply source. For example, where the scrubbing liquid comprises DI water, the scrubbing liquid supply can be a DI water source or even tap water which can, for example, be de-ionized and further cleaned as needed by the recirculation unit.

In preferred embodiments, the chemical filtration system further includes a temperature control unit 160 to control the temperature of scrubbing liquid 162. In various embodiments, the temperature of the scrubbing liquid is used to control the temperature, relative humidity, or both of the return gas stream 124. In various embodiments, the gas temperature control unit 143 (and/or heat exchanger 144) together with the temperature control unit 160 is used to control the temperature, relative humidity, or both of the return gas stream 124.

In preferred embodiments, the present invention uses the temperature of the scrubbing liquid to control the relative humidity of the return gas stream by selecting the temperature of the scrubbing liquid to obtain a desired relative humidity of the return gas stream after any temperature adjustment by a heat exchanger and/or gas temperature control unit. The appropriate scrubbing liquid temperature needed to obtain a desired relative humidity of the return gas stream at a given temperature can be determined using, for example, a form of the Clausius-Clapeyron equation.

In various preferred embodiments, one or more additives are added from an additive source 170 to the scrubbing liquid to change, for example, the chemical potential or solubility of the scrubbing liquid with respect to one or more contaminants in an incoming gas stream 108. The additive source can provide, for example, an additive in substantially pure form or one pre-mixed with scrubbing liquid. In addition, multiple additive sources can be used.

In various embodiments, an additive can be added 172, for example, to cleaned scrubbing liquid 150 and/or make-up fluid 156, directly or in a mixing device 174. In various embodiments, an additive is added after 176 the temperature control unit 160 (directly or in a mixing device 178) to better control, for example, the concentration of the additive in the scrubbing liquid. The mixing devices 174, 178 can be any device suitable for mixing the additive with the scrubbing liquid and can comprise a device as simple as turbulence in a valve.

Preferably an additive provides easily rectified reactive chemistries. For example, in various embodiments, ozone ($O_3$) or peroxides (such as, for example, $H_2O_2$) are introduced as an additive in sufficient concentration to oxidize organic and inorganic contaminants; such as, for example NO and $SO_2$, through reactions such as, for example:

$$NO \xrightarrow{O_3} NO_2 \xrightarrow{O_3} NO_3, \quad \text{and} \tag{1}$$

$$SO_2 \xrightarrow{O_3} SO_3 \xrightarrow{O_3} SO_4, \tag{2}$$

which increase the solubility of the noted contaminants in water.

In various embodiments, organic compounds reacting with oxygen radicals (such as can be provided, for example, by an ozone or peroxide additive) are used to produce more polar (and thus more water-soluble) species. The preferred effect of an additive in the present invention is to shift the equilibrium between the gas and liquid phases such that contaminants are more readily removed. In embodiments including an ozone additive, for example, it is preferred that a filter media (such as a granulated activated carbon media) be provided downstream of the absorption section to remove residual ozone by, for example, room temperature catalytic destruction. Other additives for a scrubbing liquid include, but are not limited to, acids, bases and monoethanolamine.

It is preferred that additives and their concentrations are chosen such that they do not result in unacceptable health or explosive hazards, or comprise species that can have an unacceptable impact on the process being performed by the semiconductor processing tool or tool set 120. For example, monoethanolamine may not be appropriate due its hazardous effect on amplified resist processes.

In various embodiments, co-current systems and methods are useful for those contaminant removal reactions having favorable equilibrium (e.g., equilibrium which favor contaminant absorption into the scrubbing liquid throughout the absorption section), and in some situations co-current systems and methods are preferred such that high scrubbing liquid-gas stream interface areas can be achieved. Where contaminant removal reactions have unfavorable equilibrium, various embodiments of a counter-current systems and methods in accordance with the present invention are preferred.

FIG. 2 depicts a block diagram 200 of various embodiments of a counter-current filtration system that are in accordance with the present invention. In a counter-current system, an input scrubbing liquid stream 206 is introduced into an absorption section 210 in a flow direction counter to that of an output gas stream 208 from a semiconductor processing tool or tool set 220. More than one absorption section may be repeated, in series, within a counter-current system to increase, for example, contaminant removal. The absorption section contains an absorption structure wetted by the scrubbing liquid. As the gas passes the surfaces of the absorption structure wetted by scrubbing liquid, molecular contaminants with a higher chemical potential in the gas stream than scrubbing liquid pass from the gas stream to the scrubbing liquid. The system thus provides to the tool or tool set 220 a return gas stream 224 with a reduced concentration of one or more contaminants found in the output gas stream 208 (also referred to herein as the incoming gas stream because it is incoming to the absorption section 210).

After some period of operation, the incoming gas stream 208 begins to contact scrubbing liquid that contains some concentration of one or more contaminants removed from the gas streams. Although such contaminants in the scrubbing liquid tend to disfavor removal of the same contaminant species from the gas stream, the concentration of contaminants in the gas stream is also highest as it enters the absorption section, which shifts contaminant removal equilibrium in favor of contaminant removal.

As the gas stream progresses, the concentration of one or more contaminants decreases due to removal by the scrubbing liquid. Although the decrease in contaminant concentration in the gas stream tends to disfavor further removal of contaminants, the concentration of contaminants in the scrubbing liquid is also decreasing as the gas stream approaches the input scrubbing liquid. This decrease in contaminant concentration in the scrubbing liquid shifts contaminant equilibrium in favor of contaminant removal.

In preferred embodiments, the input scrubbing liquid 206 is introduced as an aerosol above the absorption structure in sufficient volume and temperature to form a liquid which wets and flows down the surfaces of the absorption structure. An aerosol of scrubbing liquid can be formed in many ways including, but not limited to, spray nozzle systems that inject into a "contacting zone" and systems that apply jets of compressed air onto the surface of a rotating or stationary scrubbing liquid distributor within the compressed air stream.

The absorption structure can comprise a loose packed-bed structure, structured packed-bed structure, or a combination of both. Preferably the absorption structure is a loose packed-bed structure, such as for example, Q-Pack, Lanpack and/or Nupack all manufactured by Lantec, Inc., Raschig rings, Pall rings, Berl saddles, Inatolex saddles, Flexrings, Ballast rings, and Cascade rings. Examples of structured packed-bed structures include, but are not limited to, Gempack™ cartridges, and Glitsch EF-25A Grid™, manufactured by Glitsch, Inc., of Dallas, Tex. FIGS. 3A-3E show examples of various packed-bed structures, where FIG. 3A 301 is an example of a ceramic Intalox™ saddle; FIG. 3B 303 is an example of a plastic Super Intalox™ saddle; FIG. 3C 305 is an example of a Pall ring; FIG. 3D 307 is an example of a Gempack™ cartridge; and FIG. 3E 309 is an example of a Glitsch EF-25A Grid™. The design of the absorption structure is preferably such that there is sufficient residence time of the gas stream to allow for mass transfer of molecular contaminants from the output gas stream to the scrubbing liquid on the absorption structure.

In various embodiments, the absorption section includes a source of UV energy (for example, such as a UV lamp) and absorption structures having $TiO_2$ coated surfaces. In combination with sufficient UV energy, such absorption sections are used to perform catalytic reactions within the absorption section that reduce organic compounds and facilitate their removal from an incoming gas stream.

In various embodiments, the incoming gas stream 108 is pre-processed with a pre-processor device 130 prior to entering the absorption section 110. In various embodiments, the pre-processor device 130 includes a source of UV energy (for example, such as a UV lamp) and surfaces coated with a photocatalyst such as, for example, $TiO_2$, ZnO, $WO_3$, or other inorganic compounds with proper UV light absorbing properties. In combination with sufficient UV energy, such pre-processor devices are used to perform photocatalytic reactions that can reduce organic (polar and non-polar) compounds and facilitate their removal from an incoming gas stream. For example, photocatalytical reaction can cause a partial "mineralization" of organic compounds (for example, formation of $CO_2$, $H_2O$) and the formation of by-products, the prevailing fraction of which are oxygenated substances. Thus non-polar compounds can be "transformed" to polar compounds which can be more effectively removed by a scrubbing liquid. In various embodiments, gaseous chlorine-containing compounds like trichloroethylene (TCE) or polychloroethylene (PCE), which are greatly accelerate photocatalytical reaction of organics via additional chain reaction with Cl species, can be added to the incoming gas stream by the pre-processor device to, for example, "spike" the gas stream. Chlorine containing by-products and HCl formed in this case can be effectively removed by the scrubbing liquid and, in various embodiments, increase the scrubbing liquids removal efficiency towards bases due to this induced activity.

In various embodiments, a pre-processor device 230 adds on additions for the incoming gas stream 208 that facilitates the removal of one or more contaminates in the gas stream. The additive can, for example; (1) chemically reactive with one or more containments to produce species that are more readily removed by the scrubbing liquid; (2) change the chemical potential of one or more contaminants with respect tot the scrubbing liquid to facilitate there removal; and (3) facilitate contaminant detection and concentration determination, for example, to provide metrology information, hazard warnings, et al.

The molecular contaminants which have a higher chemical potential in the gas stream than in the scrubbing liquid on the surfaces of the absorption structure are absorbed by the scrubbing liquid. In addition,.because the expected concentration of some contaminants in the incoming gas stream are expected to be low (for example, typically lower than about 50 µg/m³ for non-polar organics); in the present invention, polar scrubbing liquids are not limited to reducing the concentration of polar contaminants and non-polar scrubbing liquids are not limited to reducing the concentration of non-polar contaminants. For example, non-polar organics contaminants with, for example, concentrations less than about 50 µg/m$^3$, can have sufficient solubility within a polar scrubbing liquid of the present invention such as, for example DI water, such that the scrubbing liquid can reduce the concentration of one or more of these non-polar organics.

At the end of the absorption section 210, a collection device 240 removes scrubbing liquid droplets from an outgoing gas stream 242. In preferred embodiments, the scrubbing liquid comprises DI water and the collection device 240 removes water droplets from the gas stream 242 such that the return gas stream 224 is saturated with water vapor at a desired relative humidity. Suitable approaches and devices for scrubbing liquid droplets from a gas stream, include, but are not limited to, collection by coalescing media, collection by vane separators and collection by an extended surface of a packed bed.

In various embodiments, the system includes a gas temperature control unit 243 that can adjust the temperature of the return gas stream 224. The gas temperature control unit can include a heater, cooler, or both. In various embodiments, the system can include a non-condensing regenerative heat exchanger 244. The heat exchanger 244, for example, can exchange enthalpy from the "warm" incoming gas stream 208 to the colder "washed" gas stream 224. The heat "recovered" can reduce any heating requirements for the return air stream 224 when the return air stream is colder than the output air stream 208. A reduction in heating requirements can reduce electrical power consumption, such as by electrical resistive elements, and thereby conserve energy resources and lower operating costs.

The scrubbing liquid 246 exiting the absorption section is cleaned and recirculated with a recirculation unit 248 to provide cleaned scrubbing liquid 250. In various embodiments, scrubbing liquid removed 252 from the return gas stream is also conveyed to the recirculation unit 248 for cleaning and recirculation. Generally, separation of molecular contaminants from a liquid (such as, for example, separation of ionic species for DI water) is significantly more efficient with lower typical operating costs than atmospheric-pressure gas phase separation.

In preferred embodiments, the scrubbing liquid comprises DI water. DI water can be cleaned in a recirculated loop using conventional methods, such as, for example, (UF/RO), twin bed ion exchange resins, mixed bed resin bottles, and organic membrane separation, and liquid-phase carbon adsorption for organics removal and particle filtration for particulate removal. Scrubbing liquid cleaning can include, for example, photocatalysis on immobilized $TiO_2$ or $TiO_2$ slurry, and advanced oxidation processes, such as, for example, processes which include $H_2O_2$, $O_3$, Fenton's reagent, and ionizing radiation.

In various embodiments, the DI water is also treated by the recirculation unit to prevent biological fouling of the absorption structure and other wetted sections of the system, because, for example, de-ionized water containing dissolved chemical species (particulate, organic, and inorganic) can provide a reasonable source of "food" for biological activity. Suitable treatments to prevent biological fouling include, but are not limited to irradiation of the DI water with ultra violet (UV) light in the C band (about 200 nm to about 290 nm), ozonization, and peroxidation.

To maintain scrubbing liquid volume, in various embodiments, scrubbing liquid is supplied as required from a scrubbing liquid supply 254. If the supply 254 provides sufficiently clean scrubbing liquid, then make-up scrubbing liquid can be supplied directly 156 and mixed with the cleaned scrubbing liquid 250. The supply 254 can also provide make-up fluid 258 to the recirculation unit 248. The scrubbing liquid supply can be any suitable supply source. For example, where the scrubbing liquid comprises DI water, the scrubbing liquid supply can be a DI water source or even tap water which can, for example, be de-ionized and further cleaned as needed by the recirculation unit.

In preferred embodiments, the chemical filtration system further includes a temperature control unit 260 to control the temperature of scrubbing liquid 262. In various embodiments, the temperature of the scrubbing liquid is used to control the temperature, relative humidity, or both of the return gas stream 224. In various embodiments, the gas temperature control unit 243 (and/or heat exchanger 244) together with the temperature control unit 260 is used to control the temperature, relative humidity, or both of the return gas stream 224.

In preferred embodiments, the present invention uses the temperature of the scrubbing liquid to control the relative humidity of the return gas stream by selecting the temperature of the scrubbing liquid to obtain a desired relative humidity of the return gas stream after any temperature adjustment by a heat exchanger and/or gas temperature control unit. The appropriate scrubbing liquid temperature needed to obtain a desired relative humidity of the return gas stream at a given temperature can be determined using, for example, a form of the Clausius-Clapeyron equation.

In various preferred embodiments, one or more additives are added from an additive source 270 to the scrubbing liquid to change, for example, the chemical potential of the scrubbing liquid with respect to one or more contaminants in an incoming gas stream 208. The additive source can provide, for example, an additive in substantially pure form or one pre-mixed with scrubbing liquid. In addition, multiple additive sources can be used.

In various embodiments, an additive can be added 272, for example, to cleaned scrubbing liquid 250 and/or make-up fluid 256, directly or in a mixing device 274. In various embodiments, an additive is added after 276 the temperature control unit 260 (directly or in a mixing device 278) to better control, for example, the concentration of the additive in the scrubbing liquid. The mixing devices 274, 278 can be any device suitable for mixing the additive with the scrubbing liquid and can comprise a device as simple as turbulence in a valve.

Preferably an additive provides easily rectified reactive chemistries. For example, in various embodiments, ozone ($O_3$) or peroxides (such as, for example, $H_2O_2$) are introduced as an additive in sufficient concentration to oxidize organic and inorganic contaminants; such as, for example NO and $SO_2$, through reactions such as, for example, reaction (1) and (2) above which increase the solubility of the noted contaminants in water.

In various embodiments, organic compounds reacting with oxygen radicals (such as can be provided, for example, by an ozone or peroxide additive) are used to produce more polar (and thus more water-soluble) species. The preferred effect of an additive in the present invention is to shift the equilibrium between the gas and liquid phases such that contaminants are more readily removed. In embodiments including an ozone additive, for example, it is preferred that a filter media (such as a granulated activated carbon media) be provided downstream of the absorption section to remove residual ozone by, for example, room temperature catalytic destruction. Other additives for a scrubbing liquid include, but are not limited to, acids, bases and monoethanolamine.

It is preferred that additives and their concentrations are chosen such that they do not result in unacceptable health or explosive hazards, or comprise species that can have an unacceptable impact on the process being performed by the semiconductor processing tool or tool set 220. For example, monoethanolamine may not be appropriate due its hazardous effect on amplified resist processes.

Figure 4A:
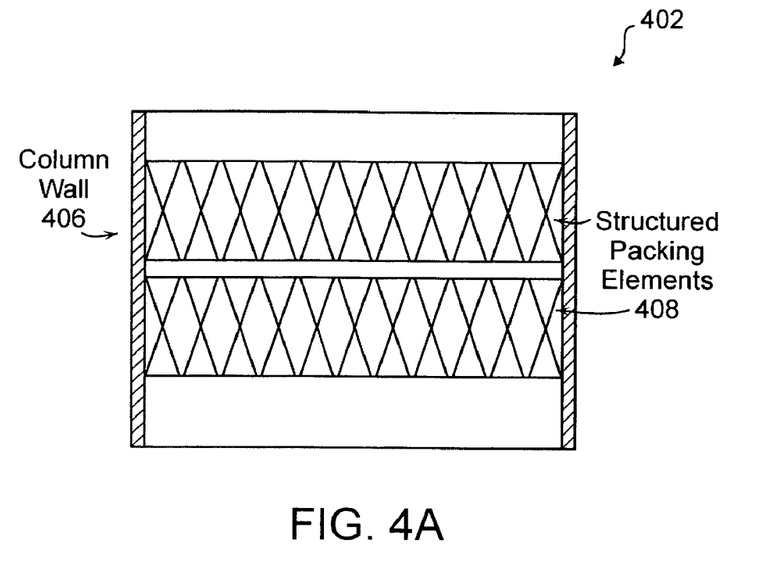
FIGS. 4A and 4B schematically illustrate, respectively, the filling of an absorption section with a structured packed-bed structure in FIG. 4A, and loose packed-bed structure in FIG. 4B.
Figure 4B:
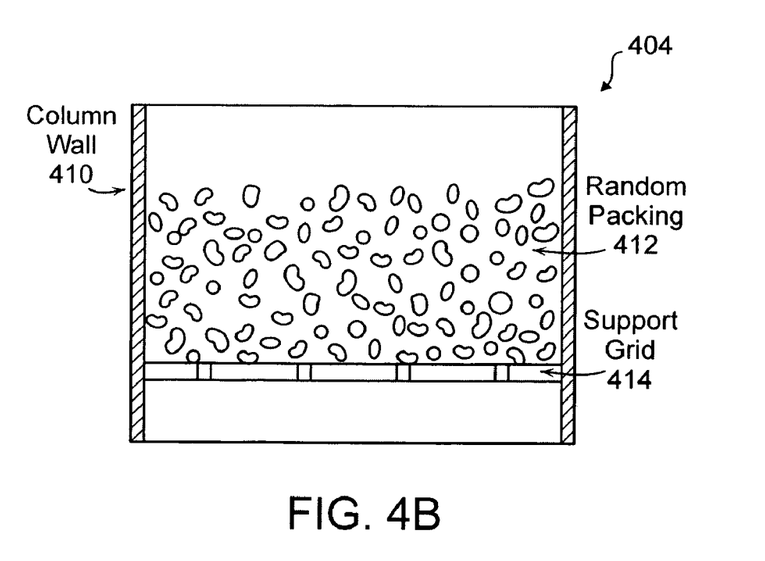

Referring to FIGS. 4A and 4B, FIG. 4A schematically depicts the filling of a portion of an absorption section with a structured packed-bed structure 402 and FIG. 4B schematically depicts the filling of a portion of an absorption section with a loose packed-bed structure 404. The packed-bed structures are disposed between walls of a column 406, 410, that can be the walls of an absorption section or of one or more columns within an absorption section. Structured packed-bed material 408 is preferably arranged within the column in an ordered fashion, whereas loose packed-bed material 412 is preferably distributed in a random fashion and supported in the absorption section by a support grid 414. The loose packed material has the advantage of greater surface area and higher capacity.

Figure 5:
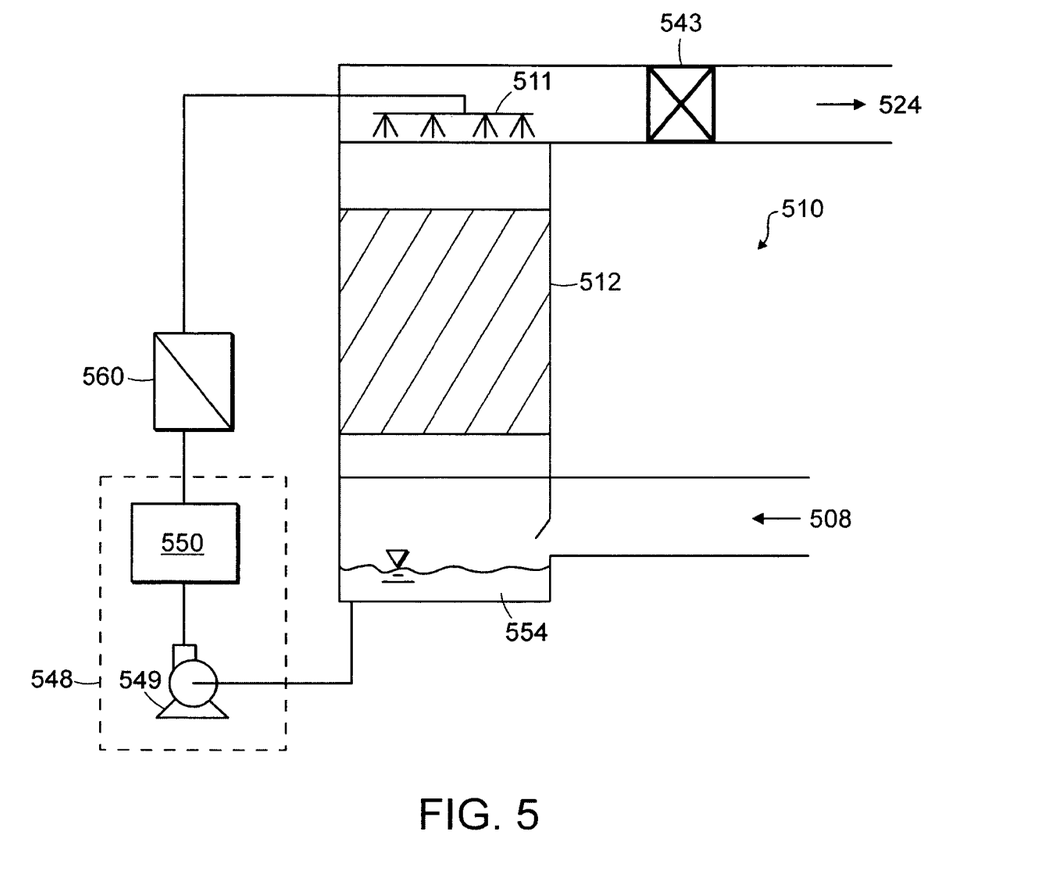
FIG. 5 is a schematic cut-away view of a counter-current air handling and chemical filtration system in accordance with various embodiments of the present invention.

FIG. 5 depicts schematically a cut-away view of a counter-current system, the incoming gas stream 508 enters the absorption section 510. Scrubbing liquid is introduced by a scrubbing liquid distributor 511 prior to the absorption structure 512. The incoming gas stream passes the wetted surfaces of the absorption structure 512 and is returned as a return gas stream 524. Prior to being returned, the gas stream temperature can be adjusted (for example, raised or lowered) by a gas temperature control unit 543 placed, for example, in the return gas stream 524 flow path.

In various embodiments, a scrubbing liquid reservoir 554 after the absorption structure captures scrubbing liquid which is recalculated by a recirculation unit 548 including a circulation pump 549 and a liquid phase chemical/particulate filters 550. The temperature of the cleaned scrubbing liquid can be controlled by a temperature control unit 560 prior to delivery to the scrubbing liquid distributor 511.

Figure 6:
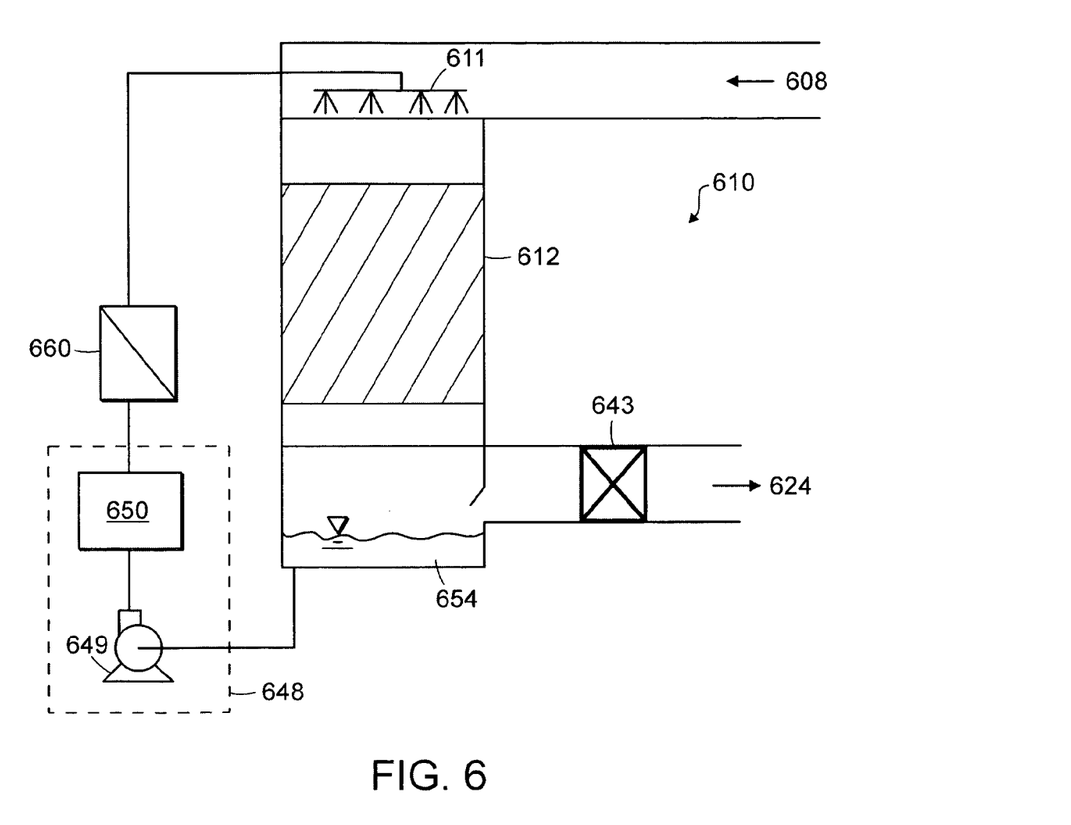
FIG. 6 is a schematic cut-away view of a co-current air handling and chemical filtration system in accordance with various embodiments of the present invention.

FIG. 6 depicts schematically a cut-away view of a co-current system, the incoming gas stream 608 enters the absorption section 610 and comes into contact with scrubbing liquid introduced by a scrubbing liquid distributor 611 prior to the absorption structure 612. The incoming gas stream passes the wetted surfaces of the absorption structure 612 and is returned as a return gas stream 624. Prior to being returned, the gas stream temperature can be adjusted (for example, raised lowered) by a gas temperature control unit 643 placed, for example, in the return gas stream 624 flow path.

In various embodiments, a scrubbing liquid reservoir 654 after the absorption structure captures scrubbing liquid which is recalculated by a recirculation unit 648 including a circulation pump 649 and a liquid phase chemical/particulate filters 650. The temperature of the cleaned scrubbing liquid can be controlled by a temperature control unit 660 prior to delivery to the scrubbing liquid distributor 611.

The claims should not be read as limited to the described order or elements unless stated to that effect. Therefore, all embodiments that come within the scope and spirit of the following claims and equivalents thereto are claimed as the invention.

What is claimed is:

1. A method for filtering a gas stream for a semiconductor processing tool, comprising the steps of:
   providing an output gas stream from a semiconductor tool, the output gas stream having contaminants;
   providing a flow of a scrubbing liquid onto an absorption structure through an inlet to an absorption section;
   contacting the output gas stream with the scrubbing liquid on the absorption structure within the absorption section such that a concentration of one or more of the contaminants in the output gas stream is reduced by sorption in the scrubbing liquid to produce an outgoing gas stream;
   removing droplets of scrubbing liquid from the outgoing gas stream to produce a return gas stream; and
   providing the return gas stream to the semiconductor processing tool.

2. The method of claim 1, wherein the semiconductor processing tool comprises a photolithography tool or photolithography tool cluster.

3. The method of claim 1, wherein the scrubbing liquid comprises water.

4. The method of claim 1, wherein the scrubbing liquid comprises de-ionized water having a resistivity in the range from about 100,000 $\Omega$ cm to about 18 M$\Omega$ cm.

5. The method of claim 1, wherein the scrubbing liquid comprises one or more additives that facilitate reducing the concentration of one or more contaminants in the output gas stream.

6. The method of claim 1, further comprising the steps of:
   controlling the temperature of the return gas stream; and
   controlling the relative humidity of the return gas stream.

7. The method of claim 1, wherein:
   the temperature of the return gas stream is controlled such that the variation in the temperature of the return gas stream is less than about 50 milliKelvin; and
   the relative humidity of the return gas stream is controlled such that the variation in the relative humidity of the return gas stream is less than about 0.2 percent.

8. The method of claim 1 further comprising scrubbing with a liquid non-polar solvent.

9. The method of claim 1 further comprising atomizing the scrubbing liquid with a liquid atomizer.

10. The method of claim 1 further comprising providing an absorption structure including a loose packed-bed.

11. The method of claim 1 wherein step of providing the output gas stream comprises providing air.

12. The method of claim 1 further comprising providing an inlet for receiving the output gas stream of the first absorption section to provide a co-current filtering process.

13. The method of claim 1 further comprising providing an inlet for receiving the output gas stream of the first absorption section to provide a counter-current filtering process.

14. The method of claim 1 further comprising illuminating the output gas stream with light.

15. The method of claim 1 further comprising illuminating the output gas stream with ultraviolet light.

16. The method of claim 1 further comprising removing acid, base and refractory compound contaminants from the output gas stream.

17. The method of claim 1 further comprising removing organic compounds from the output gas stream.

18. The method of claim 1 further comprising:
   providing an outlet in the first absorption section for providing an outgoing gas stream;

providing a first inlet in a second absorption section for receiving a scrubbing liquid;

providing an absorption structure positioned in the second absorption section such that scrubbing liquid wets a surface of the absorption structure and flows down the absorption structure;

providing a second inlet in the second absorption section for receiving the outgoing gas stream from the first absorption section, the outgoing gas stream having one or more contaminants; and the second absorption section configured such that the outgoing gas stream contacts scrubbing liquid on the surface of the absorption structure in the second absorption section and the concentration of the one or more contaminants in the gas stream is reduced by sorption in the scrubbing liquid.

19. The method of claim 18, wherein one of the first absorption section and second absorption section is configured to be operated as a counter-current system and the other of the first absorption section and second absorption section is configured to be operated as a co-current system.

20. The method of claim 1, further comprising providing a temperature control unit positioned in the flow of the scrubbing liquid to provide a temperature controlled scrubbing liquid to the inlet in the absorption section.

21. The method of claim 1, further comprising providing a heat exchanger positioned to exchange heat between the output gas stream and return gas stream.

22. The method of claim 1, further comprising providing a gas temperature control unit positioned in the return gas stream, the gas temperature control unit controlling the temperature of the return gas stream.

23. The method of claim 20 or 22, further comprising controlling the temperature and humidity of the return gas stream with the gas temperature control unit together with the temperature control unit.

24. A method for filtering and conditioning a gas stream for a semiconductor processing tool, comprising the steps of:

providing an output gas stream from a semiconductor tool, the output gas stream having contaminants;

providing a flow of a scrubbing liquid onto an absorption structure through an inlet to an absorption section;

contacting the output gas stream with the scrubbing liquid on the absorption structure within the absorption section such that a concentration of one or more of the contaminants in the output gas stream is reduced by sorption in the scrubbing liquid to produce an outgoing gas stream;

removing droplets of scrubbing liquid from the outgoing gas stream to produce a return gas stream;

controlling the temperature and humidity of the return gas stream; and providing the controlled return gas stream to the semiconductor processing tool.

25. The method of claim 24 further comprising controlling:

the temperature of the return gas stream such that the variation in the temperature of the return gas stream is less than about 50 milliKelvin; and the relative humidity of the return gas stream is controlled such that the variation in the relative humidity of the return gas stream is less than about 0.2 percent.

* * * * *